UNITED STATES PATENT OFFICE.

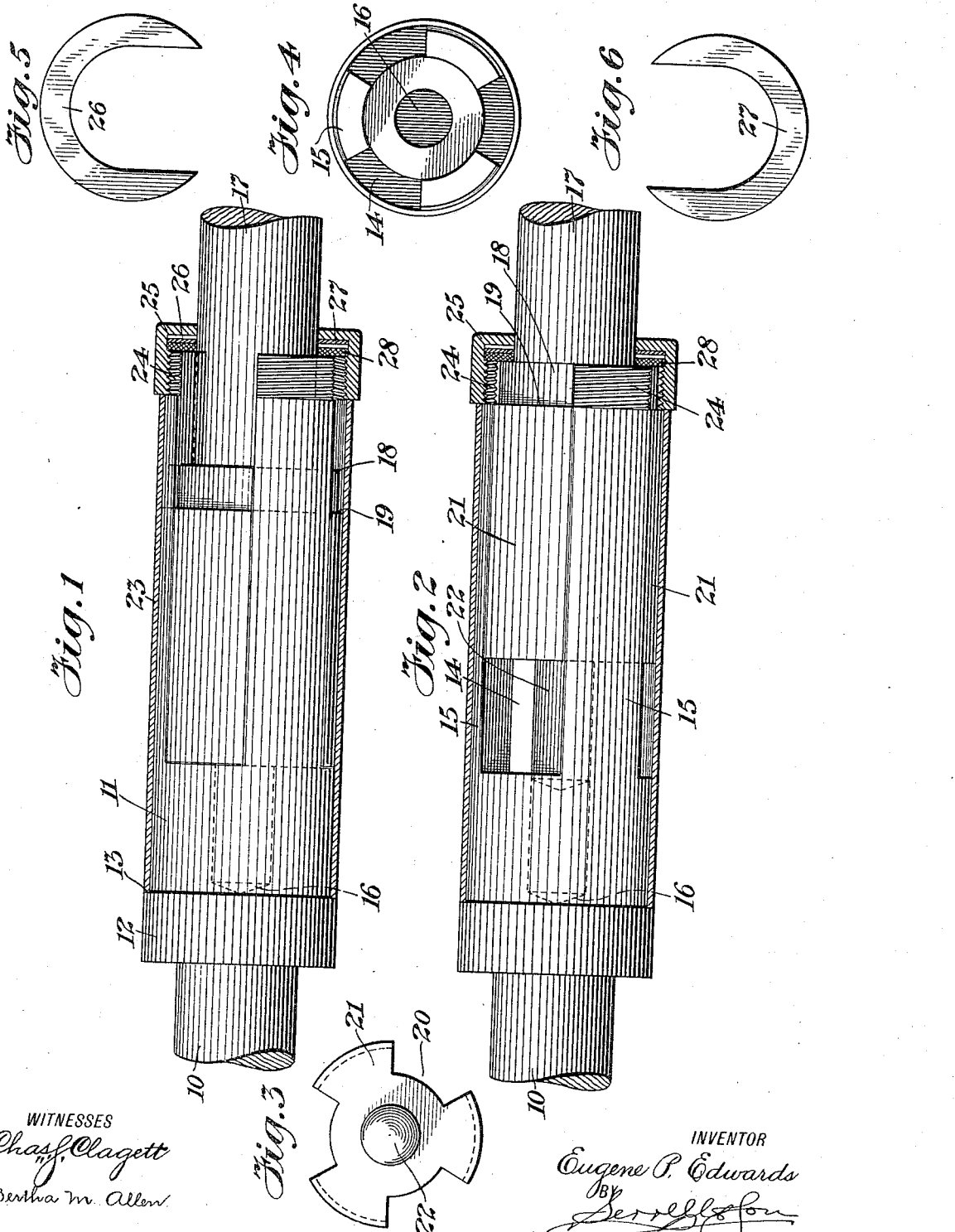

EUGENE P. EDWARDS, OF PLAINFIELD, NEW JERSEY.

SHAFT-COUPLING.

1,148,960.

Specification of Letters Patent. Patented Aug. 3, 1915.

Application filed September 2, 1914. Serial No. 859,757.

*To all whom it may concern:*

Be it known that I, EUGENE P. EDWARDS, a citizen of the United States, residing at Plainfield, in the county of Union and State of New Jersey, have invented an Improvement in Shaft-Couplings, of which the following is a specification.

My present invention relates to a shaft coupling and particularly to a sliding joint shaft coupling.

The object of my invention is the provision of an inexpensively constructed sliding joint shaft coupling to provide for the thrust occasioned between shafts, in various uses of the same, and one in which the slidable members of the ends of the shafts are so incased as to exclude dirt and dust therefrom, as will be hereinafter more particularly described.

In the drawing, Figure 1 is an elevation and partial cross section, illustrating a shaft coupling made in accordance with my present invention. Fig. 2 is a similar view showing the parts of the shaft in another position. Fig. 3 is an end view of the extremity of one shaft. Fig. 4 is an end view of the extremity of the other shaft, and Figs. 5 and 6 are elevations of span washers employed with the casing for excluding dust from the slidable parts of the coupling.

Referring particularly to the drawing, 10 indicates one shaft, which, for the purpose of explanation, may be considered a drive shaft. Adjacent its extremity, the shaft 10 is of increased diameter, as indicated at 11, and between the portion of increased diameter and the shaft 10 there is a flange or collar 12 providing a shoulder 13. The portion of increased diameter is hollow, for a predetermined distance, and slotted, as indicated at 14, providing tongues or projections 15 in equally spaced positions. As indicated in the drawing, the portion of increased diameter 11 is provided with three of the tongues 15, with the intervening slots 14, but as will be understood, any desired number of the same may be employed. The portion 11 of increased diameter is also provided with a recess 16, the purpose of which will be hereinafter described. The other shaft, which, for the purpose of explanation, may be called a driven shaft, is indicated at 17. Adjacent its extremity, this driven shaft 17 is also of increased diameter, as indicated at 18 and 19. The portion 19 of increased diameter is recessed, as indicated at 20, providing equally spaced ribs 21. The ribs 21 fit and are slidable within the slots 14 between the tongues 15, and the tongues 15 fit and are slidable within the recesses 20, when the shafts are assembled to form a coupling, the diameter of the portion 11 of the shaft 10 being the same as the portion 19 of increased diameter of the shaft 17 so that when the parts are united the surface of the slidable portions of the coupling is continuous or unbroken.

At its extremity, the shaft 17 is provided with an end projection 22, which fits and slides within the recess 16, in order to assist in centering the shafts. Fitting over the portions of increased diameter of the shafts 10 and 17, I employ a sleeve 23.

The outer surfaces of the tongues 15 are screw threaded a predetermined distance, at the ends thereof, as indicated at 24, in order to receive a cap 25, which is fitted over the shaft 17 and turned down on the screw threaded ends of the tongues 15 against the adjacent end of the sleeve 23, which, at its other end, is forced thereby against the shoulder 13. Within the cap 25, and between the inner end surface thereof and the ends of the tongues 15, I employ span washers, indicated at 26 and 27, and a packing washer 28, made of felt or other similar material, in order to exclude the dust and dirt from entering the slidable parts of the coupling from the ends thereof, it being noted that the sleeve 23 extends considerably beyond the slidable members of the coupling, at the ends distant from the cap, so that no dust and dirt can enter the same from that end thereof.

In the drawing, Fig. 1 illustrates the parts of the shafts in one extreme position, and Fig. 2 in the other extreme position, it being noted that the difference in the lengths of the tongues 15 and the ribs 21 provide for and determine the extent of the movement of the slidable parts of the coupling.

I claim as my invention:

1. A shaft coupling comprising a shaft having tongues extending therefrom, a second shaft having ribs thereon fitting within and slidable between the said tongues, which likewise fit within and slide between the said ribs, and a case completely covering the said tongues and ribs and a portion of the said shafts and secured to one of the same so as to permit the other to slide longitudinally relatively thereto.

2. A shaft coupling comprising a shaft having tongues extending therefrom, a second shaft having ribs thereon fitting within and slidable between the said tongues, which likewise fit within and slide between the said ribs, a sleeve fitting over the said tongues and ribs in adjacent portions of the said shafts, a stop on the first aforesaid shaft, and a dust proof device secured to the said tongues adjacent the ends thereof and adapted to maintain the said sleeve in position against the said stop and through which the said second shaft passes to permit the same to move relatively to the said first shaft.

3. A shaft coupling comprising a shaft which adjacent one extremity is of increased diameter and provided with tongues cut in the part of increased diameter, a collar providing a shoulder at the end of the part of increased diameter of the said shaft, a second shaft which adjacent its extremity is also of increased diameter and provided with ribs in the part of increased diameter adapted to fit within and slide between the said tongues which likewise fit within and slide between the said ribs, a sleeve fitting over the parts of increased diameters of the said shafts, and dust proof means for securing the said sleeve in position against the said shoulder.

4. A shaft coupling comprising a shaft which adjacent one extremity is of increased diameter and provided with tongues cut in the part of increased diameter, a collar providing a shoulder at the end of the part of increased diameter of the said shaft, a second shaft which adjacent its extremity is also of increased diameter and provided with ribs in the part of increased diameter adapted to fit within and slide between the said tongues which likewise fit within and slide between the said ribs, a sleeve fitting over the parts of increased diameters of the said shafts, a cap fitting over the said second shaft and turned down on the screw threaded ends of the said tongues against one end of the said sleeve to maintain the said sleeve in position with its opposite end against the said shoulder, and a packing within the said cap and between the same and the ends of the said tongues.

Signed by me this 27th day of August, 1914.

EUGENE P. EDWARDS.

Witnesses:
C. F. COLTHOR,
LESLIE R. FORT.

Copies of this patent may be obtained for five cents each, by addressing the "Commissioner of Patents, Washington, D. C."